March 15, 1960 — L. L. BLACKMER ET AL — 2,928,327
CONTINUOUS PHOTOGRAPHIC PRINTER
Filed Sept. 1, 1955 — 4 Sheets-Sheet 2
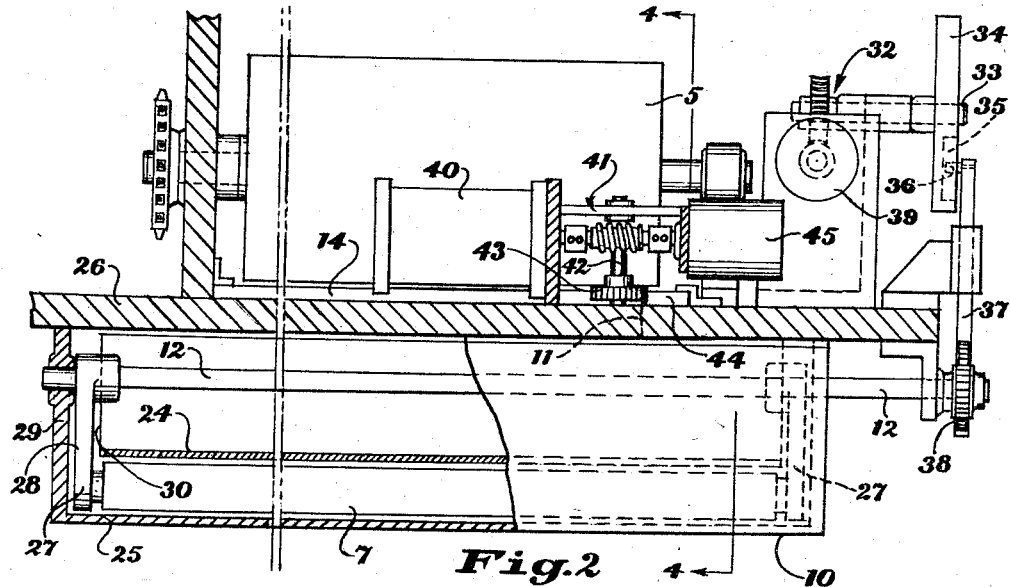
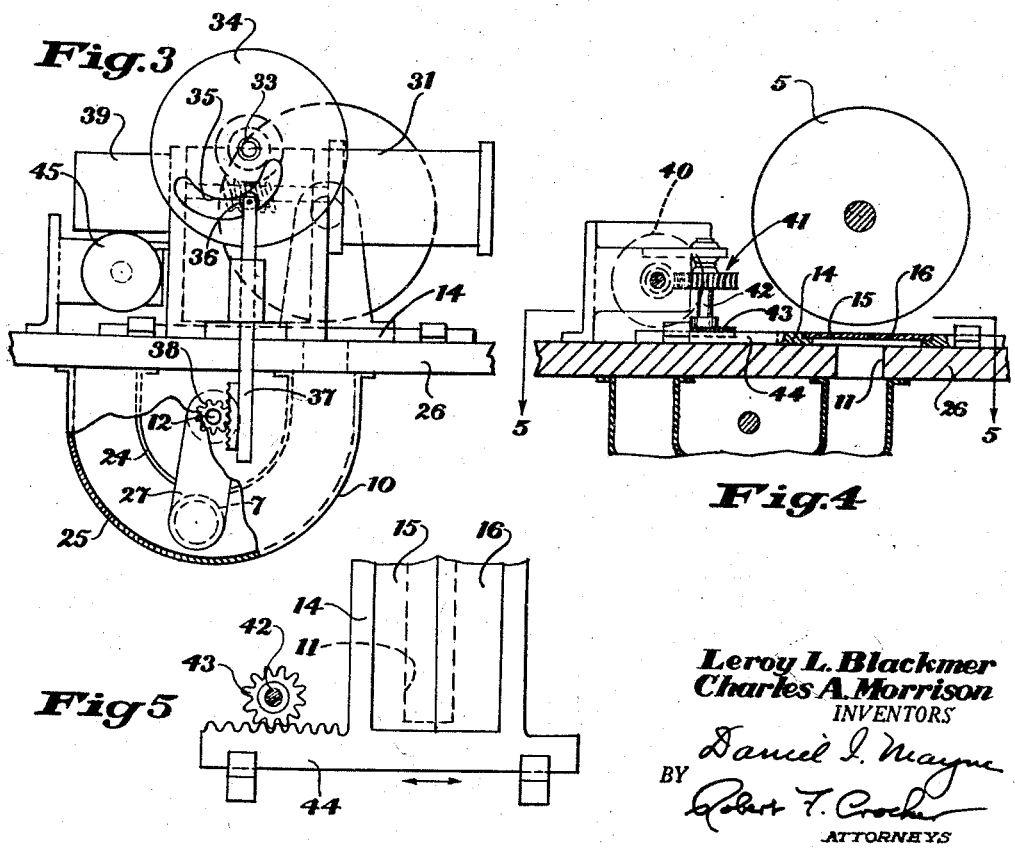
Leroy L. Blackmer
Charles A. Morrison
INVENTORS March 15, 1960 L. L. BLACKMER ET AL 2,928,327
CONTINUOUS PHOTOGRAPHIC PRINTER
Filed Sept. 1, 1955 4 Sheets-Sheet 3
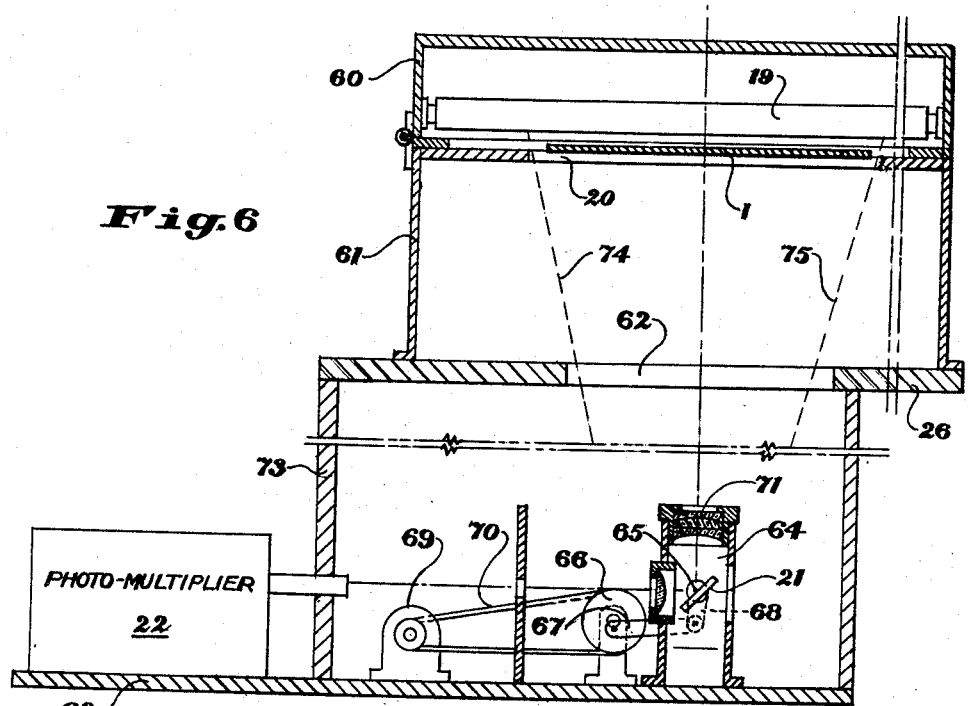
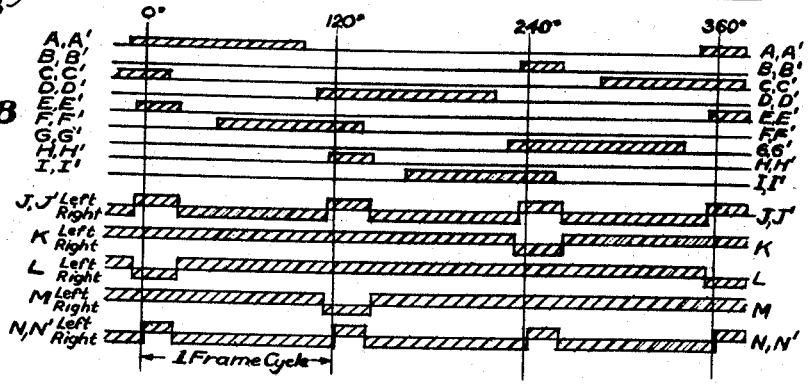
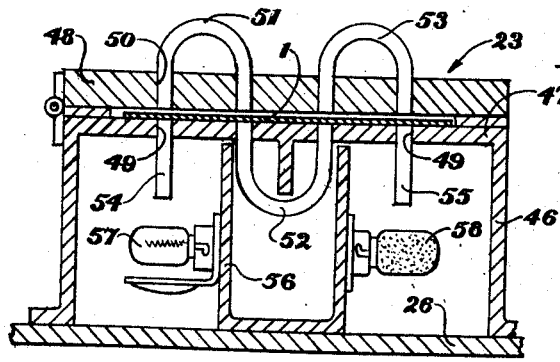
Leroy L. Blackmer
Charles A. Morrison
INVENTORS
BY
ATTORNEYS

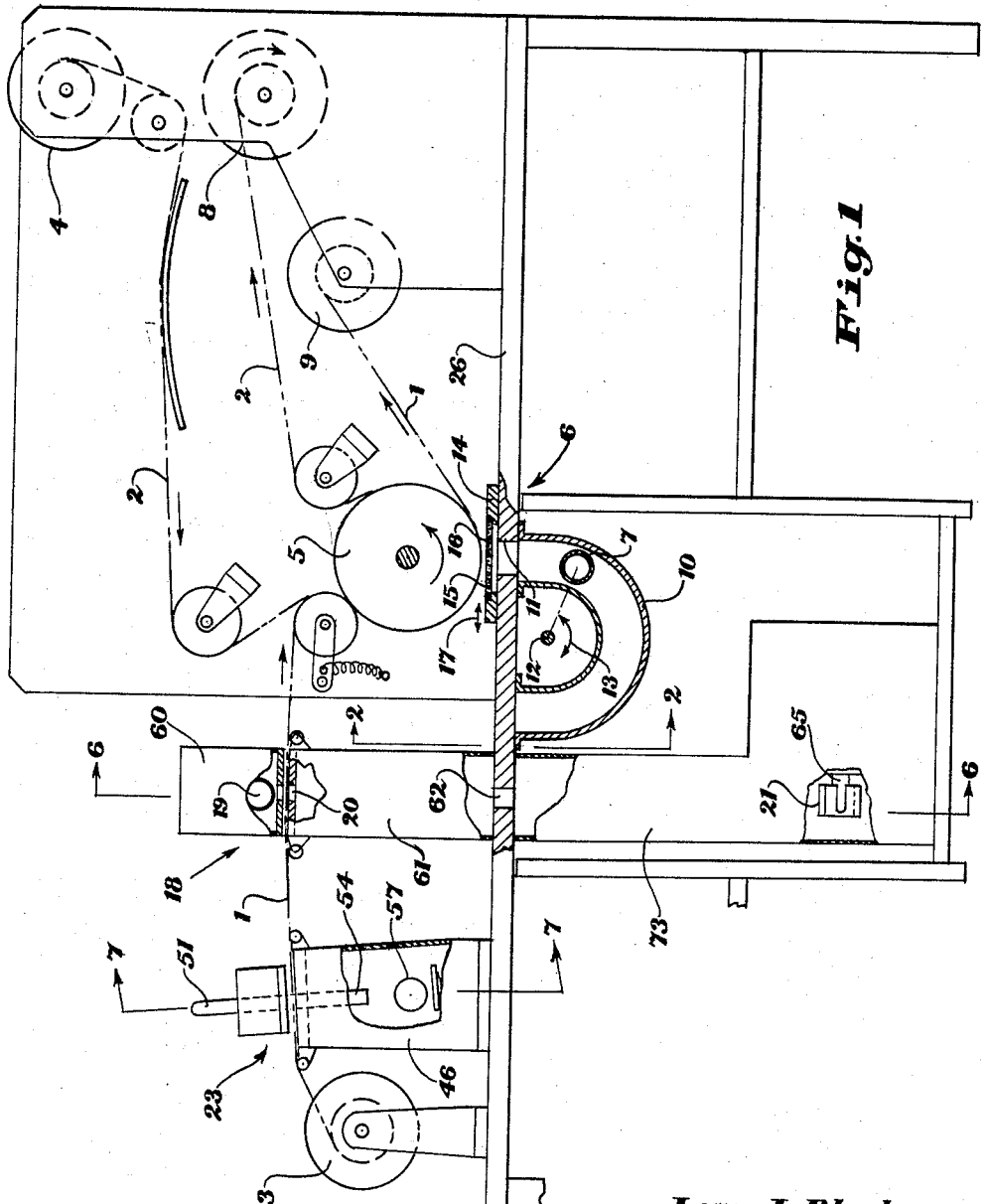

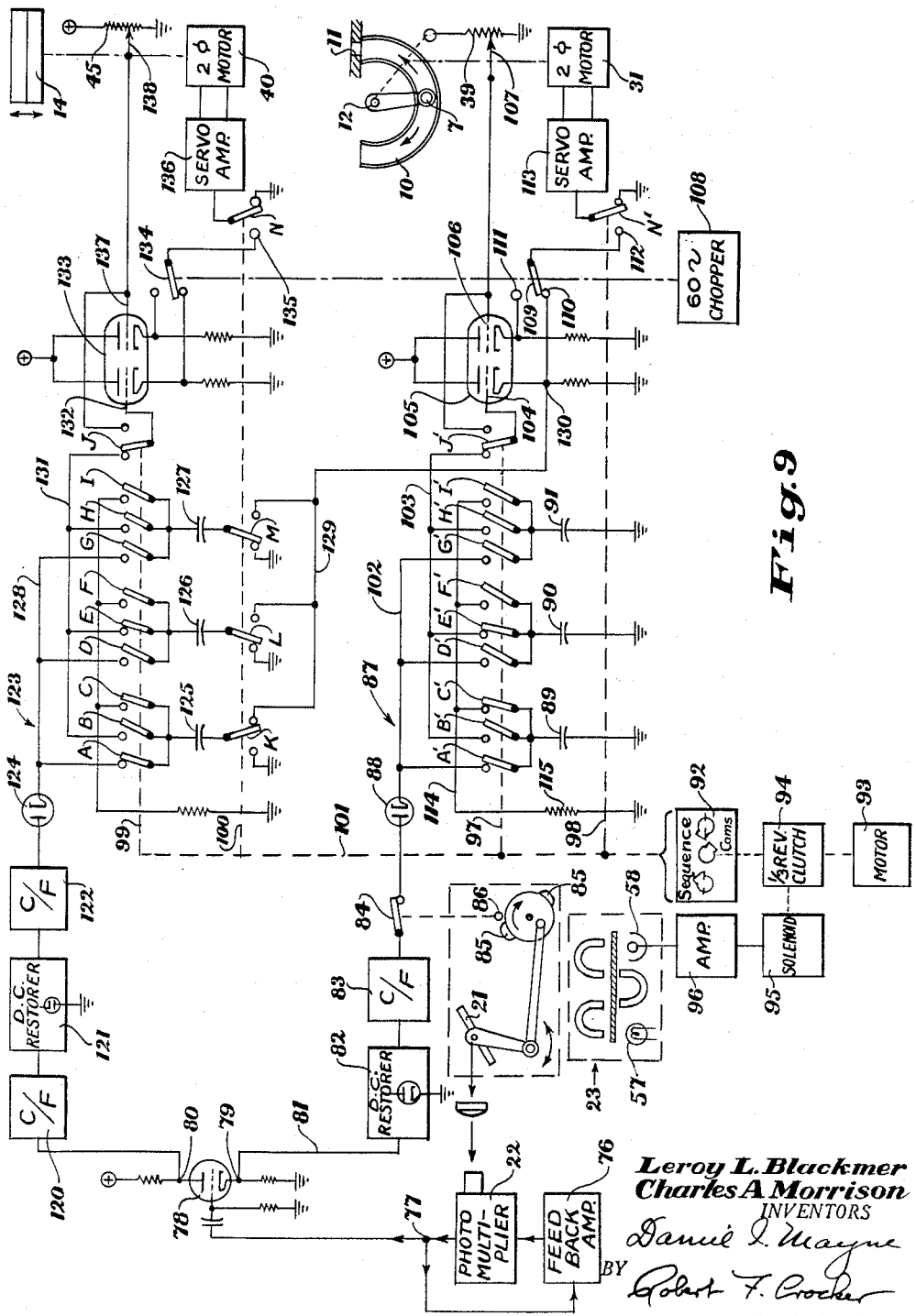

United States Patent Office 2,928,327
Patented Mar. 15, 1960

2,928,327

CONTINUOUS PHOTOGRAPHIC PRINTER

Leroy L. Blackmer and Charles A. Morrison, Rochester, N.Y., assignors to Eastman Kodak Company, Rochester, N.Y., a corporation of New Jersey Application September 1, 1955, Serial No. 532,011

6 Claims. (Cl. 95—75)

This invention relates to a continuous photographic printer of the type adapted to continuously feed a negative film strip and a strip of sensitized printing paper past a printing gate to expose the paper to light passing through the negative so as to produce a latent positive image thereof. While machines of this general type have been heretofore constructed, such prior machines have been somewhat deficient in that they fail to compensate for the variations in density and density scale or contrast of the individual negative image frames with the result that the positives, if developed under the same conditions, will differ from one another, both in density and in contrast.

It is an object of this invention to produce a continuous printer which is adapted to produce latent positive images of the individual frames of a negative film strip which, upon development under similar conditions, will produce substantially uniform positive prints, despite considerable variation in the density or contrast present in the individual negative frames.

It is a further object to provide such a printer which utilizes variable-scale printing paper, the effective "hardness" of which is dependent upon the spectral characteristics of the light to which it is exposed, and in which the exposure of the sensitized paper and the effective "hardness" or "scale" of the paper are automatically controlled in accordance with the minimum density and contrast of each individual negative frame.

Another object is to produce such an apparatus in which the negative film moves past a scanning station, located somewhat in advance of the printing station, and at which scanning station the negative is continuously scanned by suitable electro-optical means to obtain information as to the densities present in the negative, this density information being stored until such time as the particular frame involved is about to enter the printing station whereupon it is utilized to automatically set the intensity and the spectral characteristics of the printing light to give the proper exposure and contrast in the finished print.

Another object is to provide an electro-optical frame-line detector for use with such a printer whereby the scanning, storing, and utilization of the density information for a particular frame will be automatically synchronized with the movement of the film.

Still a further object is to provide an improved means for varying the intensity of the printing light at the printing gate anti-logarithmically relative to the minimum density of a particular negative frame without affecting the spectral characteristics of the light so that a wide range of negative densities may be successfully accommodated.

Further objects will become apparent from the following description and claims, particularly when considered in the light of the accompanying drawings in which:

Figure 1 is a somewhat diagrammatic view of our improved printer, certain parts being broken away to better illustrate the principle of operation thereof.

Figure 2 is a transverse sectional view taken generally on the plane indicated by the line 2—2 in Fig. 1;

Fig. 3 is a fragmentary view showing details of the light intensity adjusting means at the printing station;

Fig. 4 is a fragmentary section taken generally on the line 4—4 of Fig. 2;

Fig. 5 is a fragmentary sectional view taken on line 5—5 of Fig. 4;

Fig. 6 is a sectional view taken on the line 6—6 of Fig. 1 showing the internal construction at the scanning station;

Fig. 7 is a fragmentary sectional view taken on line 7—7 of Fig. 1 showing details of the frame-line detector;

Fig. 8 is a graph showing the time sequence of various switches shown in Fig. 9;

Fig. 9 is a schematic diagram of the electrical circuits used in the control of our printer.

As shown in Fig. 1 the printer of our invention is arranged to continuously feed a negative film strip 1 and a strip of variable-scale sensitized printing paper 2 from their respective supply reels 3 and 4 and to guide them so that they pass in superimposed relationship partially about the periphery of a printing drum 5, located at a printing station, generally indicated at 6, and at which station the sensitized paper 2 is exposed to light from a printing lamp 7 passing through the negative strip 1. From the printing station the exposed paper 2 and the negative film 1 are guided to their respective take-up reels 8 and 9. As is indicated in this figure the printing drum and take-up reels are positively driven in the direction indicated by the arrows, although no attempt has been made to illustrate the specific drive arrangement employed since any conventional drive means may of course be utilized.

The printing lamp 7 is housed within an arcuate-shaped lamp housing 10 and is arranged to be movable toward and away from the printing gate 11 about the axis of a shaft 12 as indicated by the arrow 13 so as to adjust the intensity of the illumination at the printing gate to the desired value.

As indicated above, the paper 2 is of the variable-scale type, the effective "hardness" or "scale" of which may be varied within certain limits by varying the relative amounts of blue and yellow light in the printing beam. In order to thus vary the spectral characteristics of the printing light, a filter assembly 14 is arranged in the beam of light passing through the gate 11, this filter assembly being made up of a blue filter 15 and a yellow filter 16, arranged in edge to edge relationship with one another and adapted to be moved relative to the gate 11 as indicated by the arrow 17 to vary the relative percentage of blue and yellow light used for exposure and thereby to control the effective hardness or scale of the sensitized paper 2.

Between the supply reel 3 and the printing drum 5, the negative film strip is fed past a scanning station indicated generally at 18. At this station, the light from a lamp 19, passing through the film and through a suitable slot 20, is scanned, elemental area by elemental area, by means of an oscillating mirror 21 and suitable lens system (to be hereafter described in detail) and is projected onto a photocell 22 so that the output of the photocell will be constantly varying in accordance with the point-to-point density of the negative.

To assure proper synchronism of the scanning and printing operations, the negative strip is also fed through a frame-line detector, indicated generally at 23, which may, for example, be located one frame-length ahead of the scanning station 18. The construction and operation of this unit will be explained in detail herebelow.

The means by which the intensity of the light at the printing gate 11 may be varied is best shown in Figs. 2 and 3. As illustrated therein the inner and outer walls 24 and 25 of the housing 10 are curved cylindrically about the axis of shaft 12 and are so spaced as to closely surround the lamp 7 on two sides while permitting it to be swung toward and away from the gate 11. The printing gate itself is an elongated slot extending transversely of the path of movement of the strips 1 and 2 and the inner and outer walls 24 and 25 of the housing 10 are secured to the main bed 26 of the printer adjacent the long edges of the slot. The printing lamp is preferably an elongated tubular lamp of the fluorescent type which is mounted by means of suitable arms 27 secured to the shaft 12. As shown in Fig. 2 the inner wall 24 of the housing is somewhat shorter than the outer wall 24 so that a pair of slots 28 are formed between the end edges of the wall 24 and the end walls or plates 29 of the housing to permit swinging of the arms 27 upon rotation of the shaft 12. The internal surfaces of the housing are preferably painted with a low reflectivity paint and this fact, coupled with the arcuate shape of the housing, permits a very large variation in intensity of the illumination at the gate 11 to be produced upon swinging of the lamp through its substantially 180° range of movement.

Rotation of the shaft 12 to adjust the position of the lamp is obtained by means of a 2-phase reversible motor 31 which is connected through a suitable reduction gear mechanism 32 to a shaft 33, upon the outer end of which is mounted a cam disk 34. This cam disk is provided with a non-linear camming slot 35 within which rides a follower roller 36 carried by the upper end of a rack bar 37, the lower rack-portion of which engages a suitable pinion 38 on the outer end of shaft 12. The shape of the cam slot 35 is so designed that as the lamp is shifted within the arcuate housing 10 the intensity of the illumination at the surface of the printing drum will vary substantially as an antilogarithmic function of the rotation of the motor 31 and cam 34. Also driven by the motor 31 is a potentiometer 39, preferably of the multiple revolution, helical type, so arranged that the position of the movable contact slider thereof will be a measure of the position of the lamp 7 and therefore of the exposure setting. As will be later explained this potentiometer serves in a feed-back loop for the motor 31.

As previously mentioned the effective hardness of the printing paper is controlled by varying the relative amounts of the printing light which pass through the blue and yellow filters 15 and 16 incorporated in the slidable filter assembly 14. To shift the position of the filter assembly 14, a second 2-phase reversible motor 40 (Figs. 2 and 4) is provided which is connected through suitable reduction gearing 41 and shaft 42 to a pinion 43 which in turn engages a rack bar 44 formed as a rigid extension of the unit 14 (see Figs. 4 and 5). A second helical type feedback potentiometer 45 is also driven by the motor 40 in such a way that the position of the slider therein is an indication of the relative position of the slide 14.

The frame line detector 23, which, as will be later explained in detail, serves to synchronize the various operations involved, is best shown in Fig. 7. It comprises a housing 46 having a top plate 47 which serves as a support for the negative film strip as it traverses this unit, and a bar 48 which overlies the film strip 1. The plate 47 and bar 48 are each provided with a series of holes 49 and 50, arranged oppositely one another along a line extending transversely of the direction of movement of the film strip. Secured within these holes 49 and 50 are a series of rods 51—55 of light conducting material, such as Lucite, which rods collectively serve to define an undulating light path which, by virtue of the U-shape of certain of the rods, passes back and forth through the negative film strip a plurality of times. Supported within the housing 46, as by a bracket 56, is a lamp 57 opposite the lower end of the straight light-conducting rod 54, while on the opposite side of the bracket 56 is mounted a light-sensitive photocell 58. The amount of light from lamp 57 falling upon cell 58 will therefore depend upon the sum of the densities of the film strip at the points where the light path intersects the film path. Since, in accordance with the usual practice, the spaces or frame lines between image areas or frames on a continuous strip film are substantially clear, the maximum illumination falling upon the cell 58 will occur only when one of these areas pass through the detector. As will be explained later in detail the resulting output from cell 58 at such time serves to control the timing of the various transfer and storage operations involved in controlling the exposure.

The details of the scanning station, at which the density information from the negative film is derived, is best shown in Fig. 6. It comprises an upper housing 60 in which is mounted the fluorescent lamp 19. Housing 60 is secured to the upper portion of a second housing 61 across the top surface of which the negative film 1 is adapted to be fed and in which top surface is formed the narrow elongated slot 20. Housing 61 is secured directly to the bed or table 26 which is also provided with a relatively narrow slot 62 directly below slot 20. Suitably supported below the table 26 is a supporting plate 63 carrying a bracket assembly 64 which serves as a bearing support for the previously mentioned oscillatable mirror 21.

Mirror 21 is continuously oscillated about the axis of its supporting shaft 65 as by means of an eccentric drive mechanism formed by the eccentric 66, link 67 and lever 68, the latter being rigid with shaft 65. Eccentric 66 is in turn rotated at a relatively rapid rate by means of a motor 69 and drive belt 70. A lens unit 71 is mounted in the upper end of bracket 64 directly above the mirror 21 while a second lens unit 72 is mounted in the rear wall of the bracket 64, lenses 71 and 72 together with mirror 21 serving to focus the light passing from lamp 19 through a relatively small area of film 1 onto the light-sensitive element of the photocell unit 22. In those cases where the printer is not to be operated in a darkened room, a suitable housing 73 should be provided between the table 26 and the supporting plate 63 to keep out extraneous light.

The arrangement is such that the photocell 22 "sees" at any particular instant a small circular area or spot of the negative film of about 2 mm. diameter, this area or spot sweeping laterally back and forth across the film at a high rate of speed at the same time that the film is moving toward the printing station. As indicated by the lines 74 and 75 mirror 21 is rotated through a sufficient large arc so that at the end of each half cycle of oscillation the light reaching the photocell emanates from somewhat beyond the corresponding lateral edge of the film and does not pass through the film. As will later be explained in more detail the intensity of the light then falling upon the photocell is considered to indicate zero density. While, by oscillating mirror 21 at a sufficient high rate, it would be possible to cause adjacent scanning lines to either be extremely close to one another or to actually overlap in part, thus giving substantially 100% scanning coverage, in practice it is found that a somewhat slower rate of scanning, giving only about 40% scanning coverage, is suitable.

The photocell 22 is preferably of the well-known photomultiplier type and, as indicated in Fig. 7, is provided with a feedback circuit having a feedback amplifier 76 therein arranged, for example, as shown in the Gunderson Patent No. 2,454,871 so that the output of the photomultiplier appearing at point 77 will vary logarithmically with the intensity of the light falling upon the photocell. Thus, during a scanning sequence the output wave from the photomultiplier 22 will correspond substantially exactly to the instantaneous densities present in the negative, the arrangement being such that the voltage at point 77 will be most positive at zero density and will be less positive under high density conditions.

The output voltage from photocell 22 is applied to the grid of a cathodyne phase inverter 78 which serves to produce two outputs at 79 and 80 which are of opposite polarity relative to one another. The signal appearing at the output 79 is applied as at 81 to a suitable D.C. restorer 82 arranged, as diagrammatically indicated, so as to bring the most positive peaks (which represent zero density) to a predetermined potential, for example, ground potential. The output from the D.C. restorer 82 is then applied to a cathode follower 83 which serves to raise the signal to a predetermined positive zero-density level. The output from the cathode follower 83 then passes through a cam operated switch 84 which, as is diagrammatically indicated in Fig. 7, is arranged to be open at the end of each scanning line throughout the period when the scanning beam is beyond the lateral edges of the film. While various arrangements could obviously be used to actuate the switch 84 in the proper time sequence, one suitable arrangement is diagrammatically indicated in which a pair of camming surfaces 85 which are carried by the mirror-actuating eccentric 66 engage a switch-operating follower 86 at each end of the mirror's oscillation. Thus, the opening of switch 84 serves to cut off that portion of the output from cathode follower 83 which corresponds to the zero density area and as a result the most positive peak in the remaining signal will correspond to the minimum density present in the image bearing portion of the negative during any particular scan.

This minimum density information is used to control the intensity of the printing light and thereby the exposure, the arrangement being such that the higher this voltage (the lower the minimum density), the lower will be the intensity of the printing light at the printing gate. Thus dark negatives will receive correspondingly more exposure than weak negatives.

In order to thus utilize this minimum density information, the information must be stored until just before the corresponding frame is ready to pass through the printing station. To this end a signal storage means is provided which comprises a positive-peak detecting unit 87 including a diode 88 and a series of storage condensers 89, 90 and 91. Three separate condensers are required since the scanning station is, for constructional reasons, located two frame-lengths ahead of the printing station, and before a condenser having the information stored therein for a particular frame can be reset in readiness for another frame, two additional frames will have moved past the scanning station, each of which must have the density information derived therefrom stored in a separate condenser.

To control the charging, storage, readout and reset operations of the individual condensers a series of cam-actuated sequences switches A' through J' are provided. These cam switches are arranged to be operated in predetermined sequence by a suitable plurality of sequence cams collectively designated and diagrammatically indicated at 92 and which are adapted to be rotated by a continuously running motor 93. Interposed between the motor 93 and the sequence cams 92 is a solenoid-actuated clutch 94 which is arranged, upon energization of its solenoid 95 to operate the sequence cams 92 through 1/3 of a complete revolution. The clutch solenoid 95 is in turn controlled by the output from the photocell 58 of the frame line scanner 23 acting through a suitable amplifier 96. Thus each time that a frame line passes the frame line detector 23 the clutch solenoid 95 will be energized to cause driving of the sequence cams 92 through 1/3 cycle. The relative speeds involved are such that these cams will be rotated through 1/3 of a complete cycle in substantially the same time required for one frame-length movement of the film 1. As is indicated by the dash lines 97 through 101, in addition to the switches A' through J', there are also several other switches similarly actuated by the sequence cams 92 for various purposes which will be hereafter explained. These additional switches have been designated A through N and N'. The time sequence of the various switches is shown in graphical form in Fig. 8 for slightly more than one full revolution of the cams 92. In this figure the portion of each revolution of cams 92 during which a particular switch is closed is denoted by the cross-hatched portion opposite the corresponding reference letter. The switches are shown in Fig. 7 in the position which they would assume at the start of a complete revolution of the sequence cams as designated by the line labeled 0° in Fig. 8. Note that each one third revolution corresponds to the movement of the film through one frame length.

The output from the diode 88 is applied as by leads 102 to each of switches A', D' and G'. As can be seen, at the start of this particular cycle switch A' is the only one of these switches closed and, as soon as the reset switch C' has been opened, condenser 89 will therefore be charged to the positive peak value appearing at the output of switch 84 for the particular frame. As shown in Fig. 8 switch A' is closed throughout almost the entire period during which that particular frame is passing the scanning station. When this switch opens, condenser 89 will remain charged at this peak voltage which represents the minimum density value for that particular frame. However, near the end of the next one third revolution of the cams switch B' will close, applying this voltage through the lead 103, switch J' (the left hand contacts of which will also be closed at this time) to the grid 104 of a dual triode 105, each section of which is connected as a cathode follower. Thus the voltage at the cathode of the left hand section will assume a value corresponding to the minimum density information previously stored. The grid 106 of the right hand section of dual triode 105 is connected to the wiper 107 of the feedback potentiometer 39. As previously explained the position of the wiper 107 is an indication of the position of the printing lamp 7 and therefore of the printing intensity at the gate 11. Thus the voltage appearing on the cathode of the right hand section of the dual triode will correspond to the actual exposure setting then in the apparatus.

These two cathode voltages are compared by meeans of a 60 cycle chopper 108 having a movable contact 109 which swings back and forth cyclically between terminals 110 and 111. Any difference in voltage between the two cathodes will thereupon produce a voltage having a square wave component at the output of switch 109, the amplitude of which will be equal to the difference between the cathode voltages and the phase of which will depend upon which of the two voltages is the higher. This square wave voltage is applied through left hand contact 112 of switch N' to a suitable phase-sensitive servo-amplifier 113, the output of which controls the speed and direction of rotation of the 2-phase motor 31 which, as previously explained, serves to position the printing lamp 7. The arrangement is such that the motor 31 will be caused to rotate in such a direction as to bring the light intensity to a value corresponding to the antilogarithm of the minimum density voltage and, at which time the feed-back voltage applied by potentiometer 39 to grid 106, will exactly equal that applied to grid 104 producing zero square-wave voltage at the output of switch 109 and causing the motor to stop when this proper setting has been reached. This whole cycle of operation of the motor is relatively rapid so that the lamp will be adjusted to the desired position during the time while the frame-line for that particular frame is passing the scanning station. From the above it can be seen that switch B' and the corresponding switches E' and H' serve to control the read-out of the stored information from their respective condensers 89 and 91.

Shortly after the termination of the read-out interval the switch C' will again close to connect the condenser 89 through lead 114 and resistor 115 to ground, discharging the condenser and preparing it for another cycle of operation. As indicated in Fig. 8 this switch remains closed until slightly after the beginning of the next one-third cycle of operation of the cams, its opening actually signaling the beginning of the information-storage operation.

As will be noted from Fig. 8, during the one-third cycle while information is being retained in condenser 89, the density information derived by the scanning means from the next succeeding frame will be applied to condenser 90 through switch D'. Also during the next one-third cycle (corresponding to the third frame) condenser 91 will be charged through switch G' while the information in condenser 90 remains stored therein and that in condenser 89 is being read out. Thus, for example, condenser 89 serves to store the information for frames 1, 4, 7 etc.; condenser 90, for frames 2, 5, 8 etc.; and condenser 91, for frames 3, 6, 9, etc.

Switch J' is, as shown in Fig. 8, closed toward the right except during the read out intervals. This serves to connect left hand grid 104 of the dual triode 105 in parallel with the right hand grid 106 so that there will be no square wave output from the chopper 109 except during the actual read-out interval. Moreover, to insure that once the lamp 7 has been adjusted to a desired setting it remains in that condition for the full frame interval, the input of the servo amplifier 113 is connected to ground through the right hand terminals of switch N' except during the actual exposure adjusting interval. It is to be noted from Fig. 8 that this interval occurs just after the beginning of each ⅓ cycle of the cams 92 and that the closing of the left hand contact of this switch actually determines the time at which a readjustment of the exposure adjusting unit can take place.

The position of filter unit 14, and therefore the effective hardness of the printing paper, should, for best results, be controlled in accordance with the range of densities or contrast present in the corresponding frame of the negative. Such contrast information is obtained by effectively subtracting the minimum density from the positive density and positioning the filter unit 14 in accordance with this difference. To this end the signal voltage or density information appearing at the output 80 of phase inverter 78 is applied to a cathode follower 120, the output of which is in turn applied to a D.C. restorer 121 arranged, as diagrammatically indicated, so as to bring the most negative peak in the signal to ground potential. It should be remembered that the output signal 80 is inverted relative to that at 79 so that these negative peaks also correspond to the zero-density signals, produced as the scanning spot moves beyond the edge of the negative. Conversely the most positive portion of the signal at this point will correspond to the point of maximum density in the negative so that the output from the D.C. restorer 121 will therefore have a positive peak value corresponding to the maximum density in the negative. This voltage is applied to a second cathode follower 122 which raises it to the desired zero-density D.C. level. The output from cathode follower 122 is then applied to the maximum-density information storage means indicated generally at 123, which corresponds to the storage means 87 in the minimum-density channel. This storage means likewise comprises a positive peak detector using a diode 124 and a plurality of storage condensers 125, 126 and 127 adapted by means of sequence switches A through I to be sequentially connected to the output 128 of the diode 124.

As will be noted from Fig. 8 switches A through I operate simultaneously with the corresponding switches A' through I' in the minimum density channel. However, storage condensers 125 to 127 are not directly grounded as are those in the minimum-density channel but instead have their lower plates connected to the movable contacts of sequence switches K, L and M. As will be seen from Fig. 8 while switches K, L and M normally have their left hand contacts closed so as to connect their associated condensers to ground as in the minimum-density channel, during the read-out interval for a particular condenser, the corresponding switch, for example K, moves to its right hand position as indicated in Fig. 7 ungrounding the associated condenser 125 and connecting it through lead 129 to the cathode terminal 130 of the left-hand section of dual triode 105 in the minimum-density channel. It will be remembered that at this same time the D.C. voltage at the point 130 corresponds to the minimum density stored in the corresponding one of the condensers 89 to 91. The lower the minimum density, the higher will be the voltage at point 130. Thus, when switch K closes, the voltage, corresponding to the maximum density, which is stored in condenser 125 will be superimposed upon that appearing at the point 130 and the sum of these voltages will be applied through lead 131 and switch J to the left hand grid of dual triode 133. This is equivalent to subtracting the minimum density from the maximum density. Thus the lower the minimum density and the higher the maximum density (in other words, the greater the contrast) the higher will be the voltage applied to grid 132.

The resulting output from the left hand section of dual triode 133 is compared with that appearing at the right hand section by means of a second set of chopper contacts 134 forming part of the chopper 108, and the resulting square wave voltage is applied through the right hand terminal 135 of switch N to a servo-amplifier 136 which controls the direction and rate of rotation of the filter-shifting motor 40. As in the exposure control channel the output voltage from the right hand section of the dual triode is controlled in accordance with the actual position of the filter by the feedback connection to the right hand grid 137 from the slider 138 of the previously-described potentiometer 45. Thus the filter 14 will be shifted to a position corresponding to and controlled by the density range or contrast present in the negative, the arrangement being such that the greater the density range or contrast in the negative, the larger the relative amount of yellow light that will be used for exposure. This will make the paper act as a "soft" paper for high-contrast negatives and a "hard" paper for low contrast negatives.

It is believed that the operation of the apparatus will readily be apparent from the previous description. As a negative film strip feeds past the frame line detector, each frame-line causes an output pulse from the amplifier 96 which in turn energizes the sequence clutch solenoid 95 to cause the cams to rotate one third of a revolution, at the end of which period the next frame line will be in position to cause another pulse, etc. Thus the rotation of the cams and the resulting opening and closing of the associated switches are maintained in accurate synchronism with the movement of the film. As previously described the timing of the switches is such that as a frame passes the scanning station, the minimum-density and maximum-density voltage peaks present in the photomultiplier output will be detected and separately stored in one pair of the storage condensers. This information will be retained until just as the frame line preceding the particular frame starts across the printing gate when the stored voltage in the minimum density channel will be utilized to cause the printing lamp 7 to shift to a position such that the intensity of illumination at the gate will be adjusted to the desired antilogarithmically related value, while the two voltages will be combined as previously described so as to produce a resultant voltage which is proportional to the contrast of the particular negative frame and which is in turn utilized to shift the filter assembly 14 to give the desired degree of effective "hardness" to the paper. These light adjustments will be completed before the actual image frame starts through the printing position and will remain at their adjusted values throughout the actual printing period. Once the stored information in one pair of condensers has thus been utilized, the condensers are discharged and placed in readiness for another storage cycle. Each pair of condensers is assigned to every third frame, with the other pairs being individually assigned to the intermediate frames, the desired selection and timing being controlled by the sequence cam switches.

The arrangement wherein the printing lamp is movable toward and away from the printing gate within the confines of the arcuate housing 10 provides a simple but highly effective means of obtaining a smooth variation in light intensity over a very wide range. With the arrangement illustrated swinging of the lamp through its 180° of movement will produce a variation in intensity at the gate of better than 100 to 1. This permits compensating for variations in minimum density of individual negative frames of better than 2 and is more than adequate to compensate for the normal variations encountered in normal practice.

Similarly the arrangement of the colored filters 15 and 16 and the manner in which they are shifted provides a highly effective means for controlling the effective hardness or scale of the variable-scale paper to match the contrast of each individual negative frame while insuring that all areas of the paper exposed to a particular frame will be of the same scale.

The frame line detector, since it responds only to the frame lines themselves, serves as a most effective means of insuring the proper synchronism, particularly when, as in this case, it controls a fractional revolution clutch driving the sequencing cams. Since the light beam therein traverses the film strip a plurality of times, the effect of any density greater than that of the film base itself at any of these points will be to cut down the light reaching the photocell reducing it to a value insufficient to cause energization of the sequence clutch solenoid. As shown, only four points across the film are thus sensed although it is obvious that a larger number could be used if desired. However, the chance that within a negative image area, all four points will be of no greater than the film-base density, is extremely remote, so that in practice the four points are found to be quite sufficient to distinguished the frame lines from an image area of a frame.

From the above it is believed clear that the objects of the invention have been attained and that a highly effective, continuous printer has been disclosed. However, obviously many changes could be made in the specific details of the apparatus shown without departing from the spirit and scope of the invention as defined by the appended claims. Thus, for example, while the negative film strip 1 is shown as being supplied from a reel 3, it is obvious that it could equally well be supplied directly from some other film processing unit operating at the same rate of feed. Likewise the exposed printing paper 2 could go directly to further processing equipment instead of the take-up reel 8. Other types of scanning mechanisms could also obviously be substituted for that shown, it being desirable however that the output therefrom be proportional to density, as in the arrangement shown.

We claim:

1. A continuous printer for exposing a strip of color-controlled, variable-scale printing paper to the individual image frames of a negative film strip, comprising a printing station, means for conjointly feeding said paper and film strips at a uniform steady rate past said printing station, a source of printing light adjacent said printing station, and exposure control means including means for controlling the intensity and means for independently controlling the spectral characteristics of the light from said source at the printing station to control the printing exposure for each individual image-bearing frame of said strip in accordance with the densities present in that frame, said exposure control means comprising a film-scanning station located adjacent the path of movement of said film strip ahead of said printing station, electro-optical means at said scanning station for deriving voltages corresponding to the maximum and minimum densities present in each frame as it passes said scanning station, means for separately storing said voltages during movement of the corresponding frame from said scanning station to said printing station, and means actuated in timed synchronism with the movement of said film strip for operatively connecting said storing means to the output of said electro-optical means during passage of a particular frame through said scanning station and to said intensity and spectral control means immediately prior to entry of said frame into the printing station, said intensity control means when so connected being responsive to the stored minimum density voltage to control the intensity of the printing light at said station in accordance therewith and said spectral control means when so connected being conjointly responsive to both said stored minimum and maximum density voltages to control the spectral characteristics of said light in accordance with the difference between said density voltages.

2. A continuous printer as set forth in claim 1 wherein said light source is mounted for movement toward and away from said printing station to vary the intensity of said printing light, and the means for controlling said intensity comprises an actuator responsive to said minimum-density voltage to position said light source in accordance therewith.

3. A continuous printer as set forth in claim 1 wherein said means for controlling the spectral characteristics of the printing light at said printing station comprises a color filter unit arranged to selectively control the relative amounts of two predetermined color components in said light, and means controlled by the difference between said density voltages for adjusting said filter unit in accordance therewith.

4. A photographic printer comprising a printing station, and means for continuously feeding a film strip bearing a plurality of longitudinally spaced image-bearing frames separated by non-image-bearing frame lines thereon together with a strip of photosensitive paper past said printing station, a printing light source at said printing station and means for controlling the exposure of said paper by said light, electro-optical scanning means located ahead of said printing station for deriving density information from each frame as it passes said scanning means, storage means for storing said density information, sequencing means for cyclically connecting said storage means to said scanning means and thereafter to said exposure control means, said exposure control means, when so connected to said storage means, being responsive to said stored density information to control the exposure of said paper by said light in accordance therewith and means including a frame-line detector located adjacent the path of movement of said film strip and operatively connected to said sequencing means to control the operation of the latter, said frame line detector being responsive to the passage of a frame line therepast for synchronizing the cyclic operation of said sequencing means in predetermined relationship to the movement of the individual image frames through said printer.

5. In a continuous printer for a film strip having a plurality of individual image frames separated by non-image-bearing frame lines, a printing station, means for continuously feeding said strip along a predetermined path past said printing station and means for controlling the printing exposure through said frames at said printing station, a film scanning station located adjacent said path ahead of said printing station and including density sensing means for deriving predetermined density information from each frame as it traverses said scanning station, a plurality of density information storage means, and sequencing means for periodically connecting each of said storage means in predetermined sequence to said density sensing means and subsequently to said exposure control means whereby the density information derived from the individual frames as they traverse said scanning station will be individually stored and subsequently individually applied to said exposure control means, said exposure control means being responsive to density information applied thereto to control the printing exposure in accordance therewith, and a frame line detector responsive to the passing of a frame line past said detector and operatively connected to said sequencing means for controlling the periodic operation thereof for synchronizing the operation of said sequencing means with the movement of the film whereby said sequencing means will render said exposure control means responsive to the density information for a particular frame as the frame line immediately preceding that frame is passing said printing station.

6. In a continuous printer for strip film having a plurality of individual image frames separated by frame lines, a printing station including a printing gate, means for continuously feeding said strip past said gate, and a source of light for illuminating said film as it traverses said gate, intensity control means for controlling said source to vary the intensity of the light at said gate, contrast control means comprising a pair of differently colored filters arranged side-by-side in the direction of film movement and mounted between said source and said film strip at said gate for conjoint adjustment in the general direction of film movement between either of two limiting positions wherein one or the other of said filters completely covers said gate, means including a scanning station positioned ahead of said printing station for determining and storing information as to the maximum and minimum densities present in each frame, and means including a frame line detector responsive to the passage of frame lines therepast to cyclically operatively connect said intensity and contrast control means to said density information determining and storing means whereby density information derived from a particular frame is applied to said control means as the frame line preceding that frame enters said printing gate, said intensity and contrast control means, when so connected, being responsive to said density information to respectively adjust the light intensity at said gate in accordance with the minimum density in said frame and to position said filters relative to said gate in accordance with the difference between said maximum and minimum densities present in said frame.

References Cited in the file of this patent

UNITED STATES PATENTS

| | | |
|---|---|---|
| 1,312,289 | Wenderhold | Aug. 5, 1919 |
| 1,804,771 | Hopkins | May 12, 1931 |
| 1,856,859 | Whitson et al. | May 3, 1932 |
| 1,973,469 | Denis | Sept. 11, 1934 |
| 2,019,748 | Tuttle | Nov. 5, 1935 |
| 2,348,862 | Sorkin | May 16, 1944 |
| 2,492,685 | Coroniti | Dec. 27, 1949 |
| 2,764,060 | Horak | Sept. 25, 1956 |